United States Patent
Gupta et al.

(10) Patent No.: US 8,226,047 B2
(45) Date of Patent: Jul. 24, 2012

(54) REDUCTION OF TIP VORTEX AND WAKE INTERACTION EFFECTS IN ENERGY AND PROPULSION SYSTEMS

(75) Inventors: Anurag Gupta, Clifton Park, NY (US); Seyed Gholamali Saddoughi, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 607 days.

(21) Appl. No.: 12/358,929

(22) Filed: Jan. 23, 2009

(65) Prior Publication Data

US 2010/0187366 A1    Jul. 29, 2010

(51) Int. Cl.
  *B64C 23/06* (2006.01)
(52) U.S. Cl. ..................... 244/199.3; 244/205
(58) Field of Classification Search ............... 244/199.3, 244/205
  See application file for complete search history.

(56) References Cited

U.S. PATENT DOCUMENTS

| | | | |
|---|---|---|---|
| 3,360,220 A * | 12/1967 | Meyer | 244/205 |
| 6,004,095 A | 12/1999 | Waitz et al. | |
| 6,513,754 B1 | 2/2003 | Grove | |
| 6,570,333 B1 * | 5/2003 | Miller et al. | 315/111.21 |
| 6,651,935 B2 | 11/2003 | Loth et al. | |
| 6,805,325 B1 * | 10/2004 | Malmuth et al. | 244/205 |
| 7,066,431 B2 | 6/2006 | Scott et al. | |
| 7,624,941 B1 * | 12/2009 | Patel et al. | 244/3.22 |
| 2002/0190165 A1 | 12/2002 | Glezer et al. | |
| 2007/0095987 A1 | 5/2007 | Glezer et al. | |
| 2007/0241229 A1 | 10/2007 | Silkey et al. | |
| 2008/0023589 A1 * | 1/2008 | Miles et al. | 244/205 |
| 2008/0061192 A1 | 3/2008 | Sullivan | |
| 2008/0067283 A1 | 3/2008 | Thomas | |
| 2008/0149205 A1 | 6/2008 | Gupta et al. | |
| 2008/0290218 A1 | 11/2008 | Schwimley et al. | |

FOREIGN PATENT DOCUMENTS

| | | |
|---|---|---|
| EP | 1995173 | 11/2008 |
| WO | 02072421 A2 | 9/2002 |
| WO | 2008154592 | 12/2008 |
| WO | 2009/018532 | 2/2009 |

OTHER PUBLICATIONS

M. Samimy et al., "Noise Mitigation in High Speed and High Reynolds Number Jets Using Plasma Actuators," The Ohio State University, Columbus, Ohio, 13th American Institute of Aeronautics and Astronautics Conference May 21-23, 2007, AIAA-2007-3622, pp. 1-18.

* cited by examiner

*Primary Examiner* — Michelle Clement
(74) *Attorney, Agent, or Firm* — Penny A. Clarke

(57) ABSTRACT

An airfoil includes a plasma actuation surface integrated onto the airfoil surface. On the airfoil, the plasma actuation surface is configured to provide high-frequency plasma actuation along the plasma actuation surface such that excitation of the vortex flow or shear flow mitigates the vortex flow or the shear flow associated with the airfoil.

15 Claims, 8 Drawing Sheets

REDUCTION OF TIP VORTEX AND WAKE INTERACTION EFFECTS IN ENERGY AND PROPULSION SYSTEMS

BACKGROUND OF THE INVENTION

Embodiments of the invention generally relate to plasma actuation, and more particularly to tip-vortex mitigation and wake mitigation via plasma actuation for reduction of interaction events.

Generally, tip vortices and wakes shed by blades in aircraft engines, power generation equipment (e.g., wind and gas turbines), and their interactions with other systems utilizing airfoils are a source of aerodynamic loss, noise, and excitation phenomena.

For example, tip-vortices and wake from fan blades interact with downstream stators to give rise to fan noise, which is one of the main sources of aircraft engine noise. This may be exacerbated in fan designs such as un-ducted fans which feature two-prop fans within relatively close proximity. The interaction noise in such designs becomes a technological hurdle for the design's success. Furthermore, interaction events give rise to aerodynamic issues, for example in turbomachinery, where unsteady impulses due to the interaction events may excite a structural response and lead to structural issues. Tip vortices further give rise to noise problems where self-noise is an important issue, for example as in wind turbines.

Traditional approaches to wake mitigation (i.e., the removal of the wake velocity deficit that causes the unsteady aerodynamic interaction) have relied from blowing at the trailing edge of high-momentum fluid, or blowing schemes with steady and unsteady injection to rapidly mix out the wake to lower the momentum requirements. All of these however need sources of high momentum fluid that require power, but more importantly, have a high system cost due to the plumbing needs of routing high-pressure fluids through complex mechanical systems (e.g., rotating fan blades). As such, wake mitigation with actuators that have low-power requirements, and are easier to integrate into complex systems is a promising technological alternative.

Thus, example embodiments are provided which provide a reduction in interaction events without the limitations of the conventional art.

BRIEF DESCRIPTION OF THE INVENTION

An embodiment of the invention includes an airfoil. The airfoil includes a plasma actuation surface integrated onto the airfoil surface. On the airfoil, the plasma actuation surface is configured to provide high-frequency plasma actuation along the plasma actuation surface such that gas in proximity to the plasma actuation surface mitigates vortex flow or shear flow associated with the airfoil.

Another embodiment of the invention includes a power generating turbine with at least one airfoil. The airfoil includes a plasma actuation surface integrated onto the airfoil surface. On the airfoil, the plasma actuation surface is configured to provide high-frequency plasma actuation along the plasma actuation surface such that gas in proximity to the plasma actuation surface mitigates vortex flow or shear flow associated with the airfoil.

BRIEF DESCRIPTION OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION OF THE INVENTION

Figure 1:
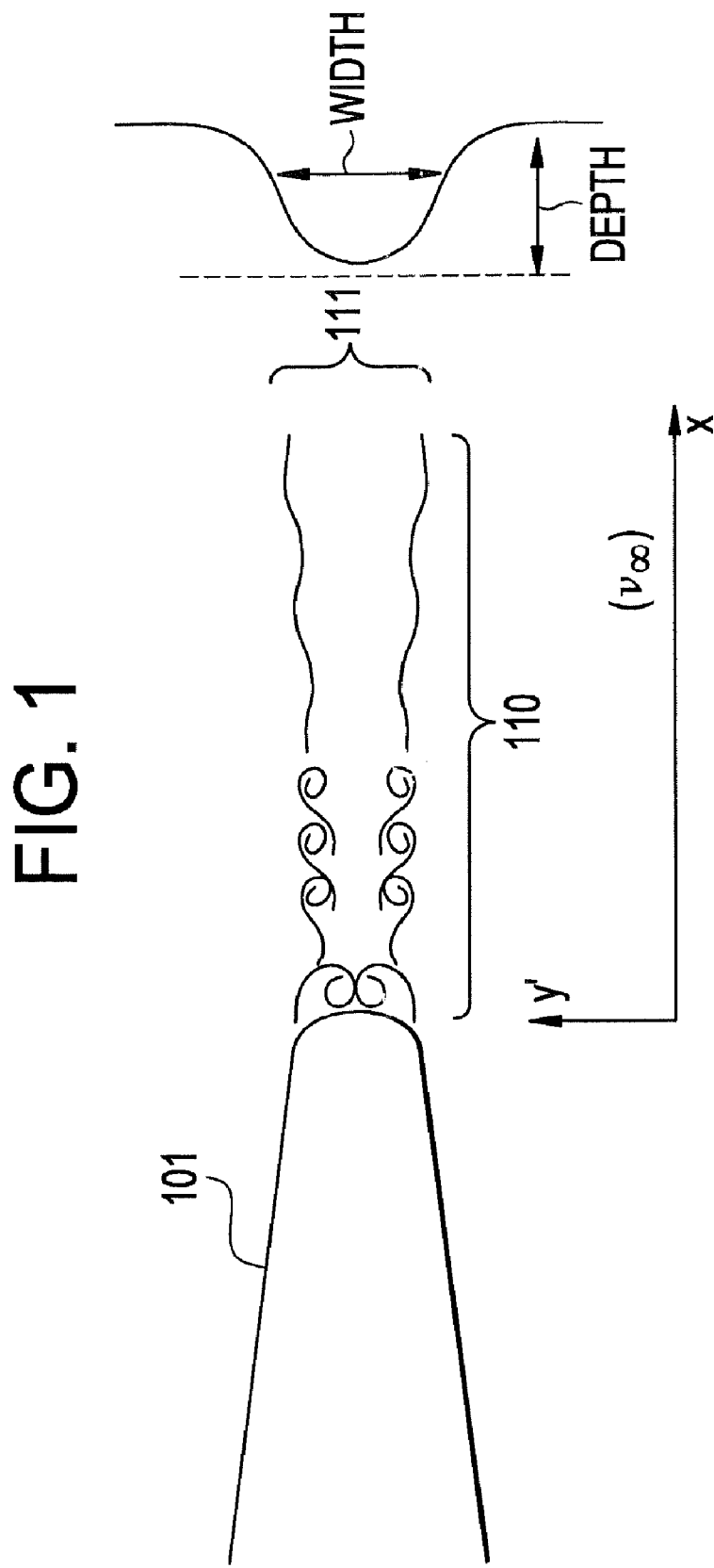
FIG. 1 illustrates a wake of a trailing edge of an airfoil.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

As used herein, specific terminology may be interpreted interchangeably depending upon any particular implementation of an example embodiment. For example, a plasma actuation surface described with reference to an airfoil may be equally applicable to a blade or any other suitable movable plane where a plasma actuation apparatus may be desirable.

Hereinafter, example embodiments of the present invention will be described in detail. According to example embodiments, plasma actuation apparatuses are provided which reduce tip-vortices and/or wake associated with airfoils. The reduction in tip-vortices and/or wake may result in a decrease in noise, aerodynamic losses or excitation associated with them directly or due to their interaction with downstream components.

Plasma flow control has typically been used for separation control, or to add additional momentum and vorticity into flows that allow for attached flows in adverse pressure gradients, and to provide better aero-thermodynamic performance. Plasma actuation has been studied for flow control in completely separated flows around bluff bodies like cylinders (e.g, landing gear struts etc). The concept and method described herein are fundamentally different in that they apply to primarily attached boundary layers and are tailored in shape, position, frequency and amplitude to trigger wake/tip vortex instabilities and/or promote rapid mixing.

According to the terminology used herein, an airfoil, unless specifically defined differently according to an example embodiment, is a 2D entity and does not have a tip vortex. A blade, however, may have both wakes and tip vortices. Also, plasma actuation will be on surfaces close to the edges of said blades/airfoils (i.e., the trailing edge or the tip).

Airfoils and blades as described herein may be airfoils or blades used in Aircraft engines, fans/propellers, pylons in energy and propulsion systems and wind turbines blades.

The plasma actuation apparatuses may generate a gas discharge where at least one electrode of the plasma actuation apparatus is covered by a dielectric (e.g., a plasma actuation surface). The physics of a gas discharge involves contraction of current carrying channels into hot streamers of air in the vicinity of the plasma actuation surface, however, charge buildup on a dielectric tends to spread current out on a surface of the dielectric of the plasma actuation surface. In this manner, a cold glow discharge may be formed at pressures and/or frequencies where a discharge between metal electrodes would yield a contracted, hot arc. A surface dielectric barrier discharge may be used as an aerodynamic actuator. Within the surface discharge, along the dielectric, and adjacent to an exposed conductor, an electrohydrodynamic body force is imparted, resulting in a wall jet along the dielectric surface and away from the exposed electrode creating a starting vortex. The frequency of this vortex generation may be controlled by a modulation rate of a voltage input to the plasma actuation apparatus.

According to an example embodiment, a plasma actuation apparatus may include a plasma actuation surface including at least one plasma actuator. The plasma actuation surface may be integrated onto an airfoil surface at a desired location to enhance wake mixing and/or tip-vortex mixing via high-frequency excitation. The plasma actuation surface may further induce instability modes in the wake and/or tip-vortex. The mixing and/or presence of instabilities may alter the strength and evolution of the vortex/wake flows, thereby diffusing them. The diffused wake and/or tip-vortex may include a modified trajectory such that it is weakened compared to typical wake and/or tip-vortices.

FIG. 1 illustrates a wake of a trailing edge of an airfoil. As illustrated, the airfoil 101 includes a trailing edge with an associated wake 110. The wake 110 may cause interaction events with other airfoils or other structures (stationary or rotating) in proximity to the wake 110, and may cause aeroacoustic noise and/or structural excitation of the down-stream structure. The width of the wake 110, denoted by 111, is associated with the airfoil 101. The curved graph depicts width/depth and illustrates the distribution of the wake 110. Noise associated with the airfoil 101 and interaction events caused by the airfoil 101 may be further increased due to tip-vortices associated with the airfoil 101.

Figure 2:
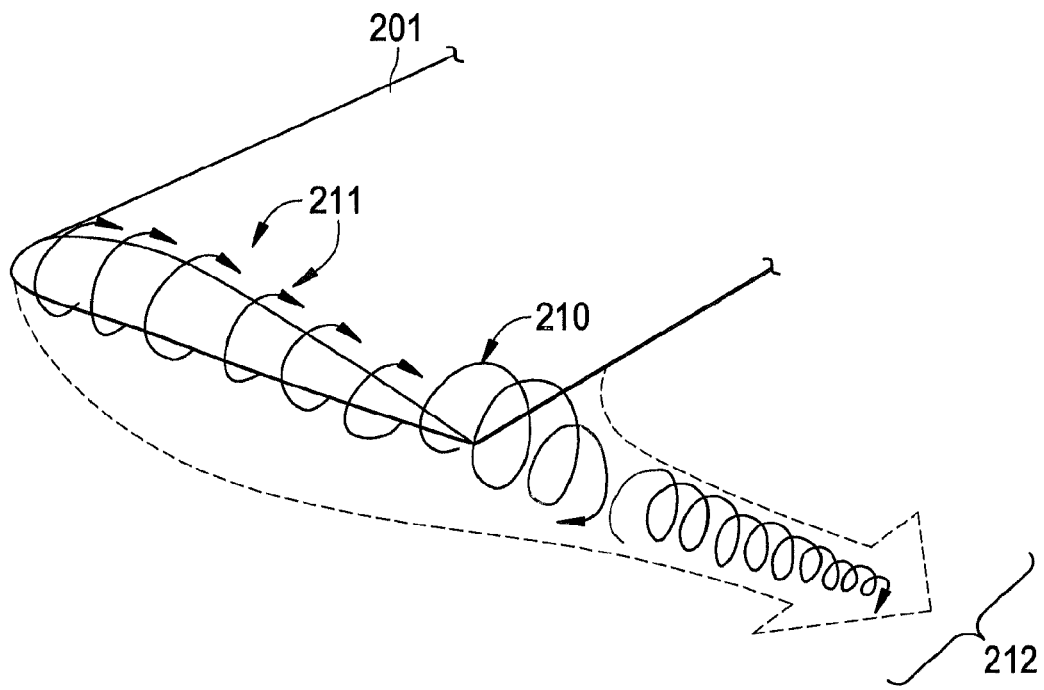
FIG. 2 illustrates tip vortices/wake of an airfoil.

For example, FIG. 2 illustrates tip-vortices/wake of an airfoil 201. The airfoil 201 may have a tip-vortex associated therewith. Tip-vortices 210 and 211 are illustrated in different views of the airfoil 201. The tip-vortex 210, for example, is illustrated along a top-view of the airfoil 201. The tip-vortex 211 is illustrated along a tip-edge view of the airfoil 201. The tip-vortices 210 and 211 associated with the airfoil 201 may include a width, 212, and may cause interaction events with other airfoils in proximity to the tip-vortices and/or structural interactions with a structure supporting the airfoil 201.

Figure 3:
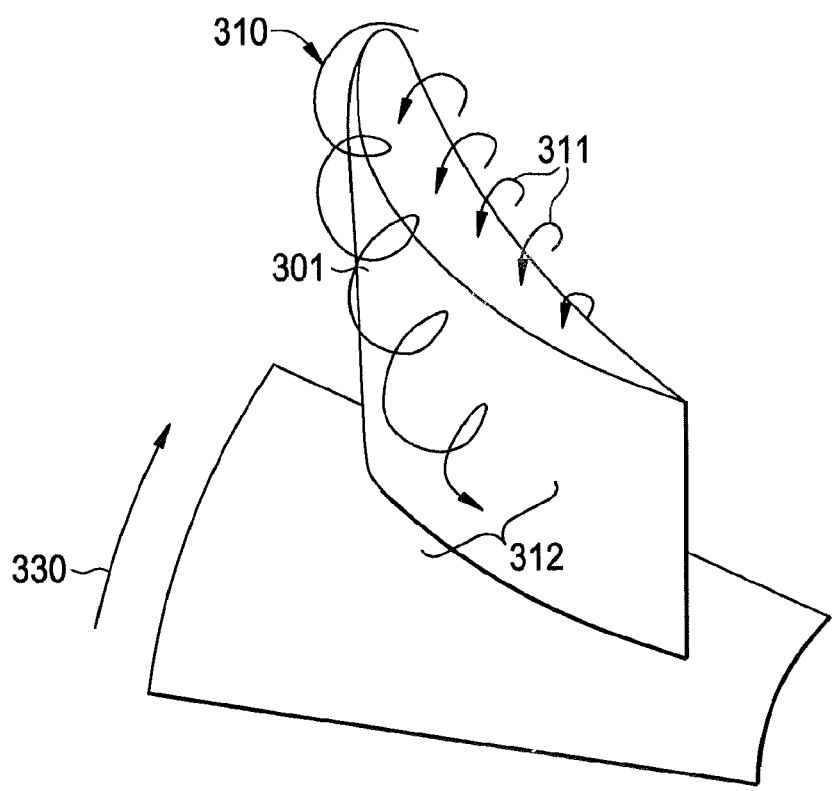
FIG. 3 illustrates tip vortices/wake of a turbine/compressor blade.

FIG. 3 illustrates tip vortices/wake of a turbine/compressor blade. The blade 301 may have a tip-vortex associated therewith. Tip-vortices 310 and 311 are illustrated in different views of the blade 301. The tip-vortex 310, for example, is illustrated along a top-view of the blade 301. The tip-vortex 311 is illustrated along a tip-edge view of the blade 301. The tip-vortices 310 and 311 associated with the blade 301 may include a width, 312, and may cause interaction events with other airfoils/blades in proximity to the tip-vortices and/or structural interactions with a structure supporting the blade 301.

Figure 4:
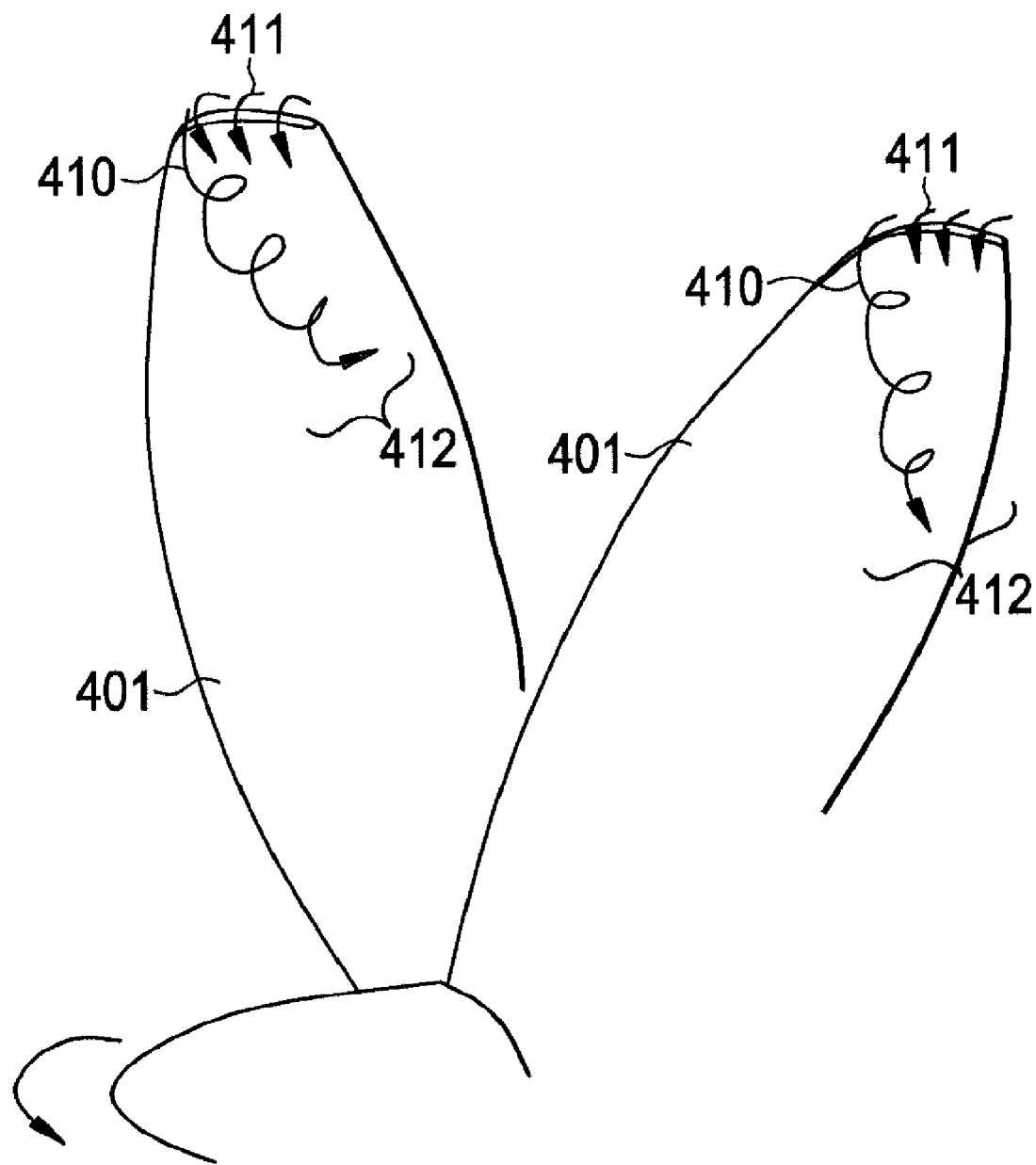
FIG. 4 illustrates tip vortices/wake of a propeller/wind turbine blade.

FIG. 4 illustrates tip vortices/wake of a propeller/wind turbine blade. The blade 401 may have a tip-vortex associated therewith. Tip-vortices 410 and 411 are illustrated in different views of the blade 401. The tip-vortex 410, for example, is illustrated along a top-view of the blade 401. The tip-vortex 411 is illustrated along a tip-edge view of the blade 401. The tip-vortices 410 and 411 associated with the blade 401 may include a width, 412, and may cause interaction events with other airfoils/blades in proximity to the tip-vortices and/or structural interactions with a structure supporting the blade 401.

Figure 5:
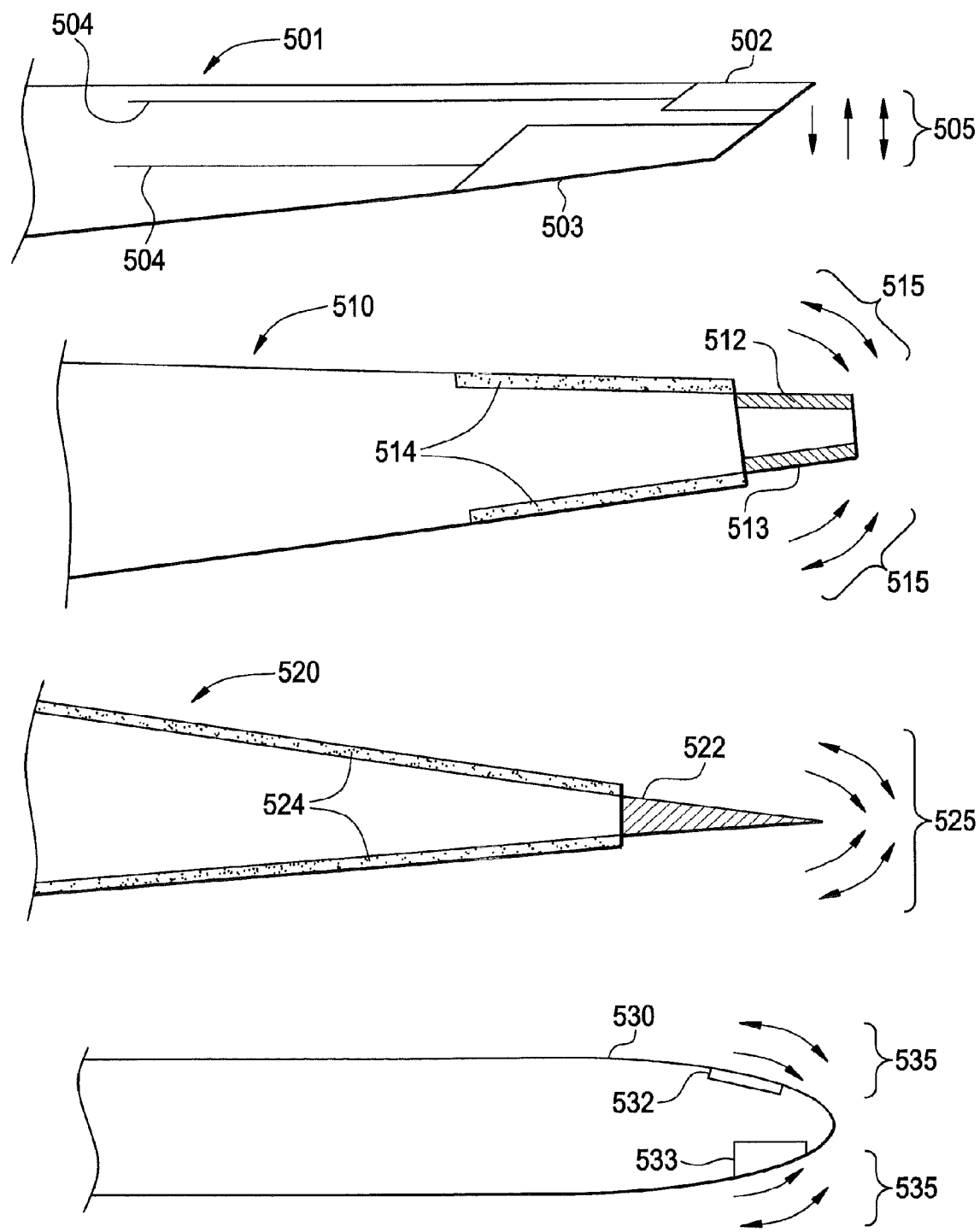
FIG. 5 illustrates example trailing edges of airfoils/blades including integrated plasma actuation apparatuses, according to example embodiments.

However, according to example embodiments, plasma actuation apparatuses are provided which reduce interaction events and/or noise. For example, FIG. 5 illustrates example trailing edges of airfoil/blades including integrated plasma actuation apparatuses, according to example embodiments. It is noted that according to example embodiments, geometric modifications may be included in airfoil/blade designs with integrated plasma actuation devices. It is further noted, however, that the particular shapes of airfoil/blade designs and/or geometric modifications, although important in some applications, are not limiting of example embodiments. For example, as the unsteady body forces (505, 515, 525, 535) may act on an airfoil/blade differently depending on a variety of factors (velocity, pressure, etc), function generators powering plasma actuation devices described herein also play an important role to adapt to differing conditions of any particular application. Therefore, the specific placement of an actuation surface is no more important, or perhaps less important, than the effects produced by the actuation surface and the function(s) driving it. Hereinafter geometric modifications included in airfoil/blade designs with integrated plasma actuation devices are described more fully.

For example, airfoil/blade 501 includes a chamfered trailing edge with a plasma actuation apparatus integrated thereon. The plasma actuation apparatus may include a plasma actuation surface 502 on a single surface of the trailing edge of the airfoil/blade 501. Furthermore, the plasma actuation apparatus may be in operative communication with a function generator and/or power source through electrodes 504. Also illustrated, airfoil/blade 501 may include a plasma actuation electrode 503 to enhance plasma actuation. Thus, example embodiments provide airfoil/blades with integrated plasma actuation apparatuses. As a further example, airfoil/blade 510 includes a plasma actuation apparatus integrated thereon.

As illustrated in FIG. 5 airfoil/blade 510 includes a truncated trailing edge with a plasma actuation device integrated in the truncated portion of the airfoil/blade 510. Furthermore, plasma actuation surfaces 512 and 513 are situation on both surfaces of the truncated portion. The plasma actuation surfaces 512 and 513 may be in operative communication with a function generator and/or power source through electrodes 514. As a further example, airfoil/blade 520 includes a plasma actuation apparatus integrated thereon.

As illustrated, airfoil/blade 520 includes a conventional trailing edge with a plasma actuation device integrated thereon. The plasma actuation surface 522 is situated on the trailing edge portion of the airfoil/blade 520, on both surfaces of the trailing edge. The plasma actuation surface 522 may be in operative communication with a function generator and/or power source through electrodes 524. As a further example, airfoil/blade 530 includes a plasma actuation apparatus integrated thereon.

As illustrated in FIG. 5 airfoil/blade 530 includes a rounded-truncated trailing edge with a plasma actuation device integrated near the rounded-truncated portion of the airfoil/blade 530. Furthermore, plasma actuation surfaces 532 and 533 are situation on both surfaces of the truncated portion. The plasma actuation surfaces 532 and 533 may be in operative communication with a function generator and/or power source through electrodes.

Figure 6:
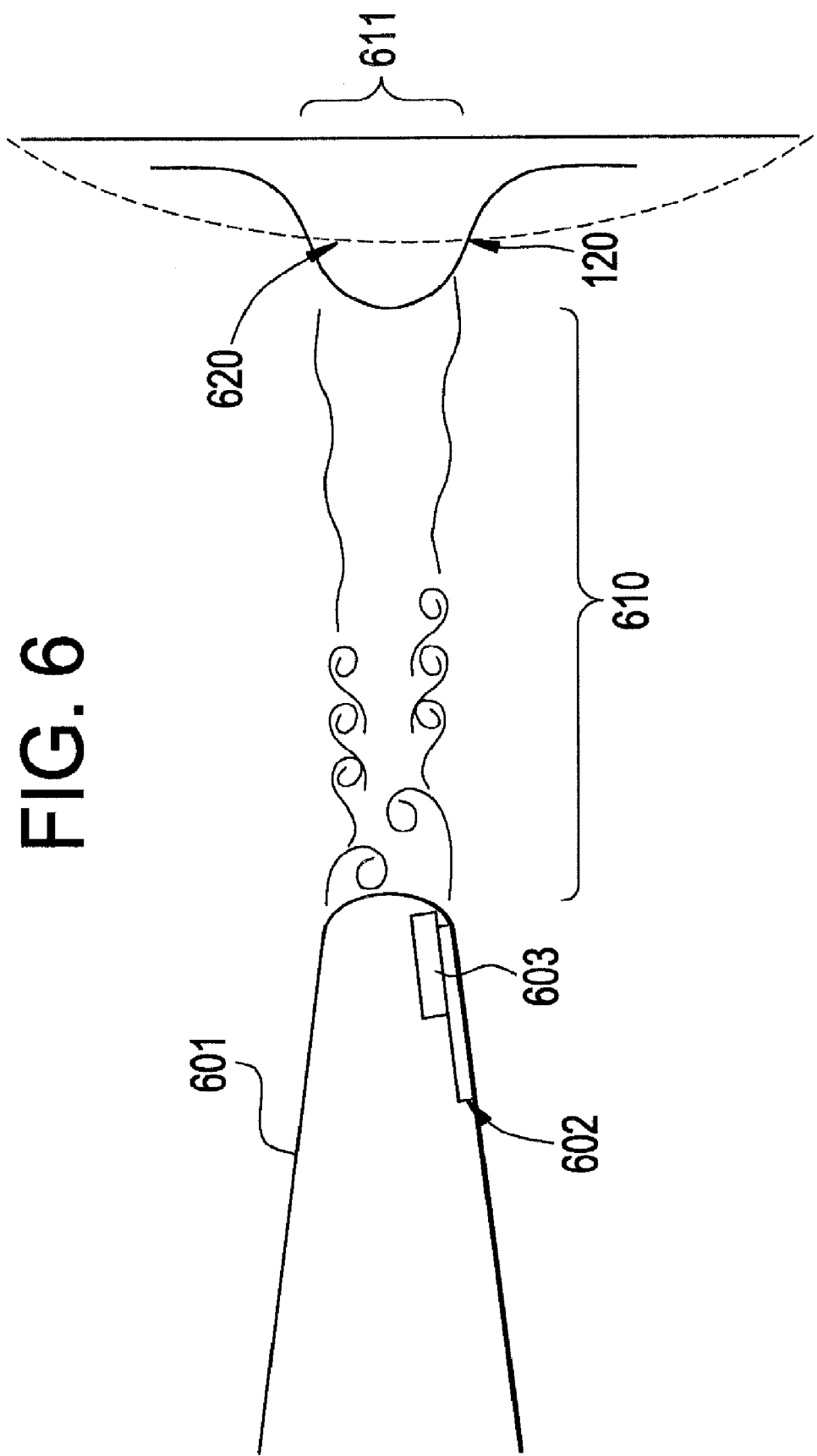
FIG. 6 illustrates a plasma actuation apparatus integrated in an airfoil/blade, according to example embodiments.

It is noted that as the plasma actuation apparatuses of example embodiments are electrically powered, there may be low design and/or integration impacts in integration of the apparatuses. Furthermore, the airfoils may be applied to fans, propellers, vanes, struts and/or other turbo-machinery blades to mitigate wake and reduce interaction events. Turning to FIG. 6, an airfoil/blade with an integrated plasma actuation device is illustrated with associated wake during operation of the plasma actuation device.

The airfoil 601 includes a plasma actuation apparatus (including actuation surface 602 and electrode 603). The wake associated with the airfoil 601, denoted by 611, is of increased width c (in a time-averaged sense) compared with that of a conventional airfoil. For example, as the plasma actuation surface 602 may exploit instabilities, inducing disturbances to the wake flow structure 610, the wake 610 may dissipate relatively faster compared to convention airfoil wake, thereby increasing the width of the wake 611. This increase in width would result in downstream airfoils or other components in proximity to the airfoil 601 to experience a spread out signature of the wake 610 compared to the denser signature of conventional airfoils. For example, the graph including curvatures 620 and 120 contrast a conventional wake width (120, see FIG. 1) versus a plasma-disturbed wake width (620). Depending on the application, the plasma actuation would be tailored to alter both the resultant depth and width of wake 610.

For example, gas in proximity to the plasma actuation surface 602 may be excited such that wake shear flow of the airfoil may be disrupted. This wake mitigation results in, according to example embodiments, less noise and/or strength of interaction events or even aerodynamic loss or self-noise of the blade. However, example embodiments are not limited to plasma actuation apparatuses configured to reduce wake associated with an airfoil. For example, plasma actuation surfaces may be included on an airfoil edge to aid in reducing tip-vortices.

Figure 7:
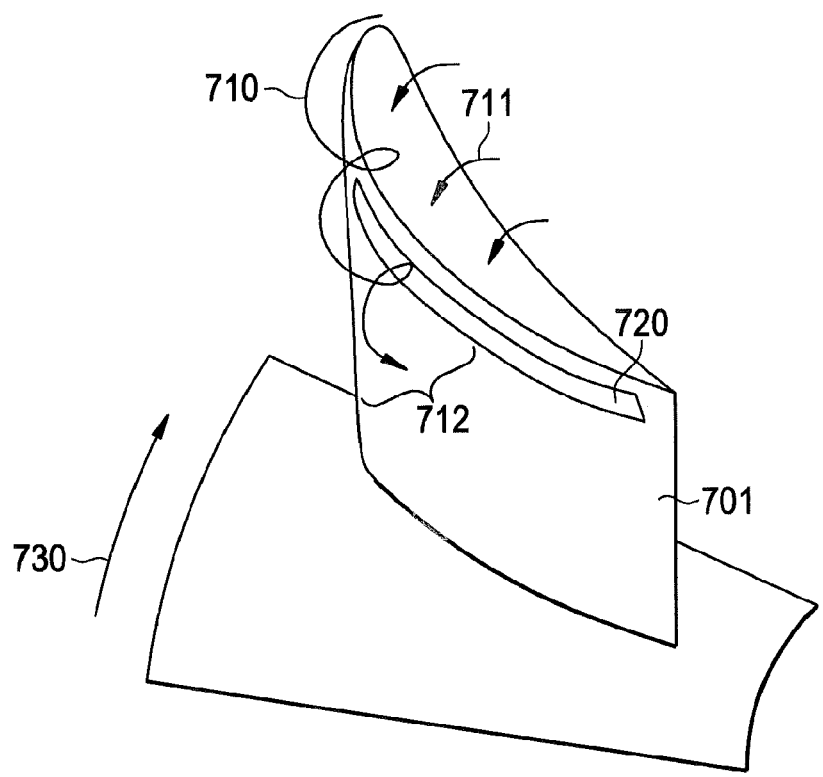
FIG. 7 illustrates a plasma actuation apparatus integrated in a blade/airfoil, according to example embodiments.

FIG. 7 illustrates a plasma actuation apparatus with an actuation surface 720 integrated in a blade, according to example embodiments. The plasma actuation surface 720 may be integrated on the upper-surface (suction side) of blade 701 or at least in relatively close proximity to the tip surface. The plasma actuation surface may be in operative communication with a function generator and/or power source through electrodes (not illustrated). The blade 701 may have a tip-vortex associated therewith. Tip-vortices 710 and 711 are illustrated in different views of the blade 701. The tip-vortex 710, for example, is illustrated along a top-view of the blade 701. The tip-vortex 711 is illustrated along a tip-edge view of the blade 701. The tip-vortices 710 and 711 associated with the blade 701 may include a width, 712, which may be reduced compared to conventional blades. Thus, the plasma actuation surface 720 integrated on the blade 701 may reduce interaction events with other blades in proximity to the tip-vortices and/or structural interactions with a structure supporting the blade 701.

For example, the plasma actuation surface 720 excites and/or destabilizes the tip vortex or wake flows to make these flow structures dissipate faster—either by reduction of vortex strength, or excitation leading to vortex bursting or alteration of the vortex evolution leading to weaker tip vortices. As a result less noise, aerodynamic loss and/or interaction events may be experienced.

Figure 8:
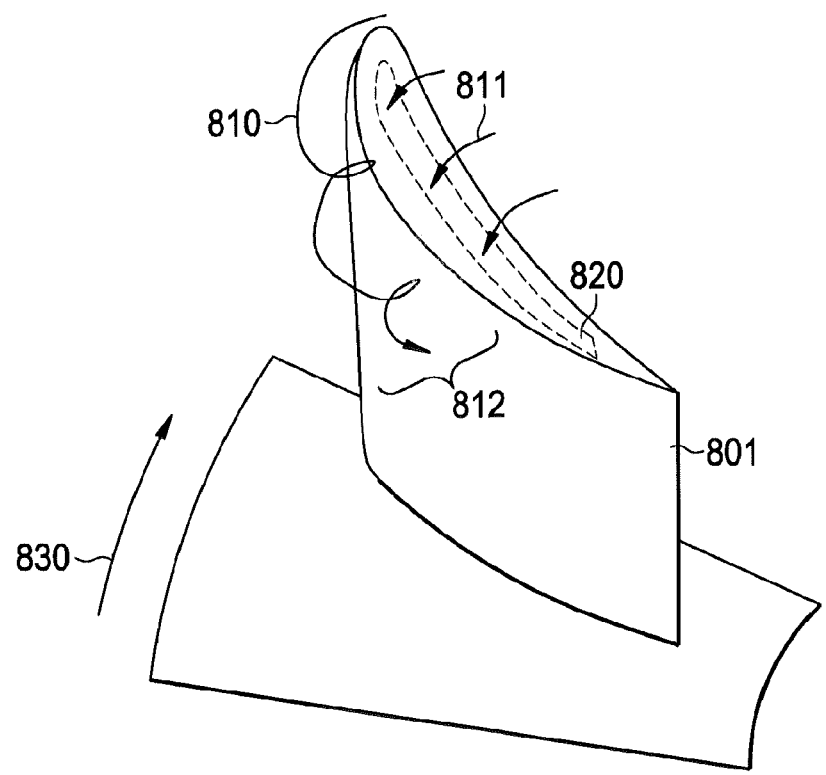
FIG. 8 illustrates a plasma actuation apparatus integrated in a blade/airfoil, according to example embodiments.

FIG. 8 illustrates a plasma actuation apparatus with an actuation surface 820 integrated in a blade, according to another example embodiment. The plasma actuation surface 820 may be integrated on the lower-surface (positive side) of blade 801 or at least in relatively close proximity to the tip surface. The plasma actuation surface may be in operative communication with a function generator and/or power source through electrodes (not illustrated). The blade 801 may have a tip-vortex associated therewith. Tip-vortices 810 and 811 are illustrated in different views of the blade 801. The tip-vortex 810, for example, is illustrated along a top-view of the blade 801. The tip-vortex 811 is illustrated along a tip-edge view of the blade 801. The tip-vortices 810 and 811 associated with the blade 801 may include a width, 812, which may be reduced compared to conventional blades. Thus, the plasma actuation surface 820 integrated on the blade 801 may reduce interaction events with other blades in proximity to the tip-vortices and/or structural interactions with a structure supporting the blade 801.

For example, the plasma actuation surface 820 excites and/or destabilizes the tip vortex or wake flows to make these flow structures dissipate faster—either by reduction of vortex strength, or excitation leading to vortex bursting or alteration of the vortex evolution leading to weaker tip vortices. As a result less noise, aerodynamic loss and/or interaction events may be experienced.

Figure 9:
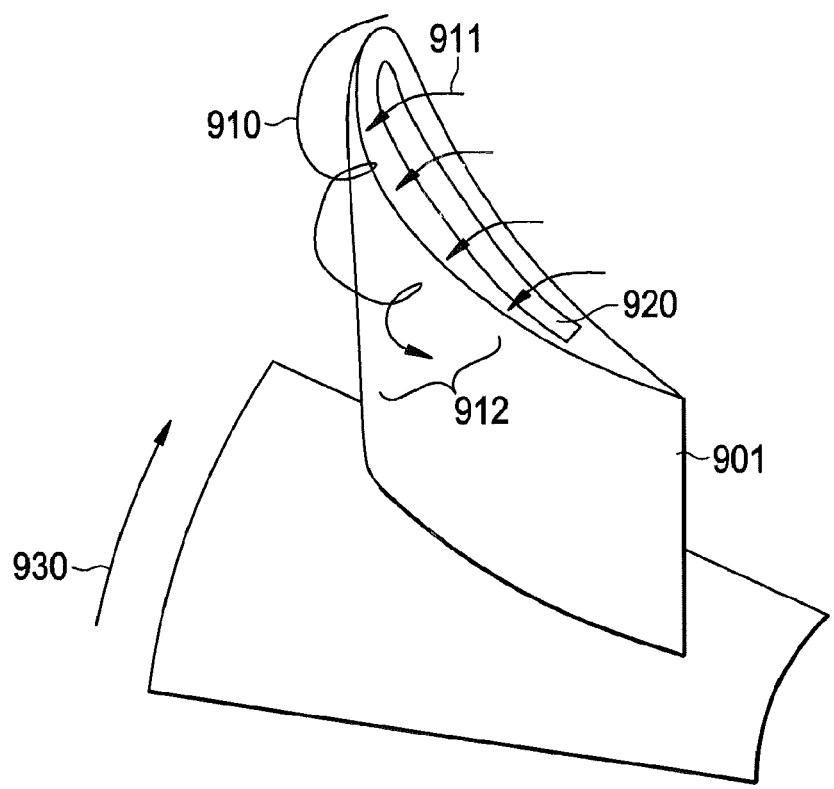
FIG. 9 illustrates a plasma actuation apparatus integrated in a blade/airfoil, according to example embodiments.

FIG. 9 illustrates a plasma actuation apparatus with an actuation surface 920 integrated in a blade, according to example embodiments. The plasma actuation surface 920 may be integrated on the tip-surface of blade 901, in any suitable location on the tip surface. The plasma actuation surface may be in operative communication with a function generator and/or power source through electrodes (not illustrated). The blade 901 may have a tip-vortex associated therewith. Tip-vortices 910 and 911 are illustrated in different views of the blade 901. The tip-vortex 910, for example, is illustrated along a top-view of the blade 901. The tip-vortex 911 is illustrated along a tip-edge view of the blade 901. The tip-vortices 910 and 910 associated with the blade 901 may include a width, 912, which may be reduced compared to conventional blades. Thus, the plasma actuation surface 920 integrated on the blade 901 may reduce interaction events with other blades in proximity to the tip-vortices and/or structural interactions with a structure supporting the blade 901.

For example, the plasma actuation surface 920 excites and/or destabilizes the tip vortex or wake flows to make these flow structures dissipate faster—either by reduction of vortex strength, or excitation leading to vortex bursting or alteration of the vortex evolution leading to weaker tip vortices. As a result less noise, aerodynamic loss and/or interaction events may be experienced.

However, example embodiments are not limited to single plasma actuation surfaces integrated on a blade. For example, a plurality of plasma actuation surfaces may be included on a surface of a blade proximate to its tip edges to actuate plasma mitigation of vortex flow of an blade.

Figure 10:
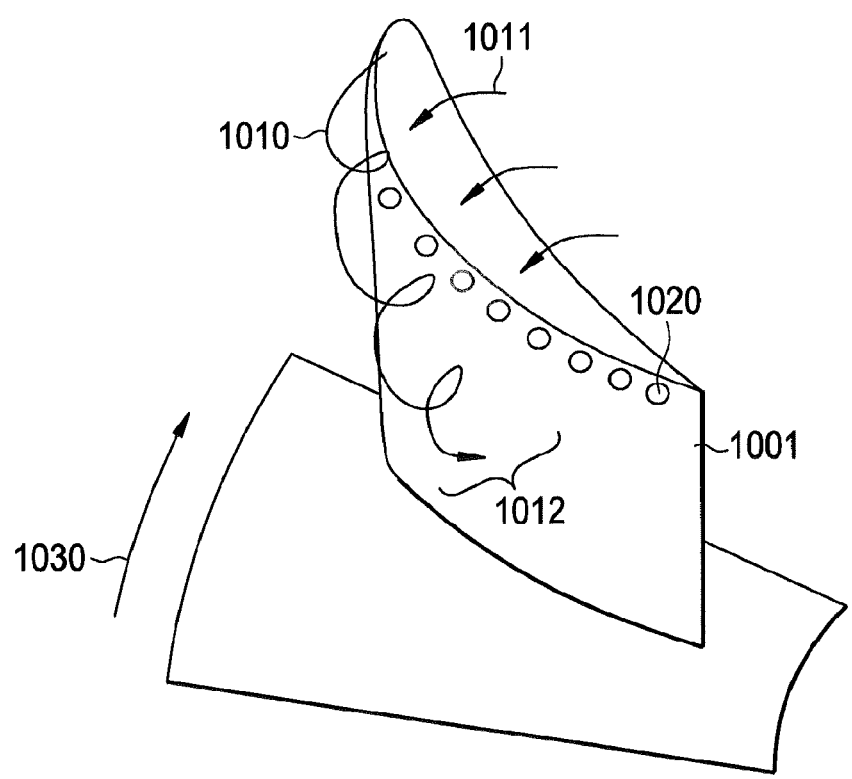
FIG. 10 illustrates a plasma actuation apparatus integrated in a blade/airfoil, according to example embodiments.

For example, FIG. 10 illustrates a plasma actuation apparatus with a plurality of actuation surfaces 1020 integrated in a blade, according to example embodiments. The plasma actuation surfaces 1020 may be integrated on a surface of blade 1001 (e.g., any suitable surface, reference for example, FIGS. 7-9). The plasma actuation surface may be in operative communication with a function generator and/or power source through electrodes (not illustrated). The blade 1001 may have a tip-vortex associated therewith. Tip-vortices 1010 and 1011 are illustrated in different views of the blade 1001. The tip-vortex 1010, for example, is illustrated along a top-view of the blade 1001. The tip-vortex 1011 is illustrated along a tip-edge view of the blade 1001. The tip-vortices 610 and 611 associated with the blade 1001 may include a width, 1012, which may be reduced compared to blades not equipped with PSM (plasma shear layer modification) devices. Thus, the plasma actuation surfaces 1020 integrated on the blade 1001 may reduce interaction events with other blades in proximity to the tip-vortices and/or structural interactions with a structure supporting the blade 1001.

For example, gas in proximity to the plasma actuation surfaces 1020 may excite and/or destabilizes the tip vortex or wake flows to make these flow structures dissipate faster such that vortex flow and/or shear flow of the blade may be disrupted. This disruption mitigates the vortex and therefore, according to example embodiments, less noise and/or interaction events may be experienced.

Figure 11:
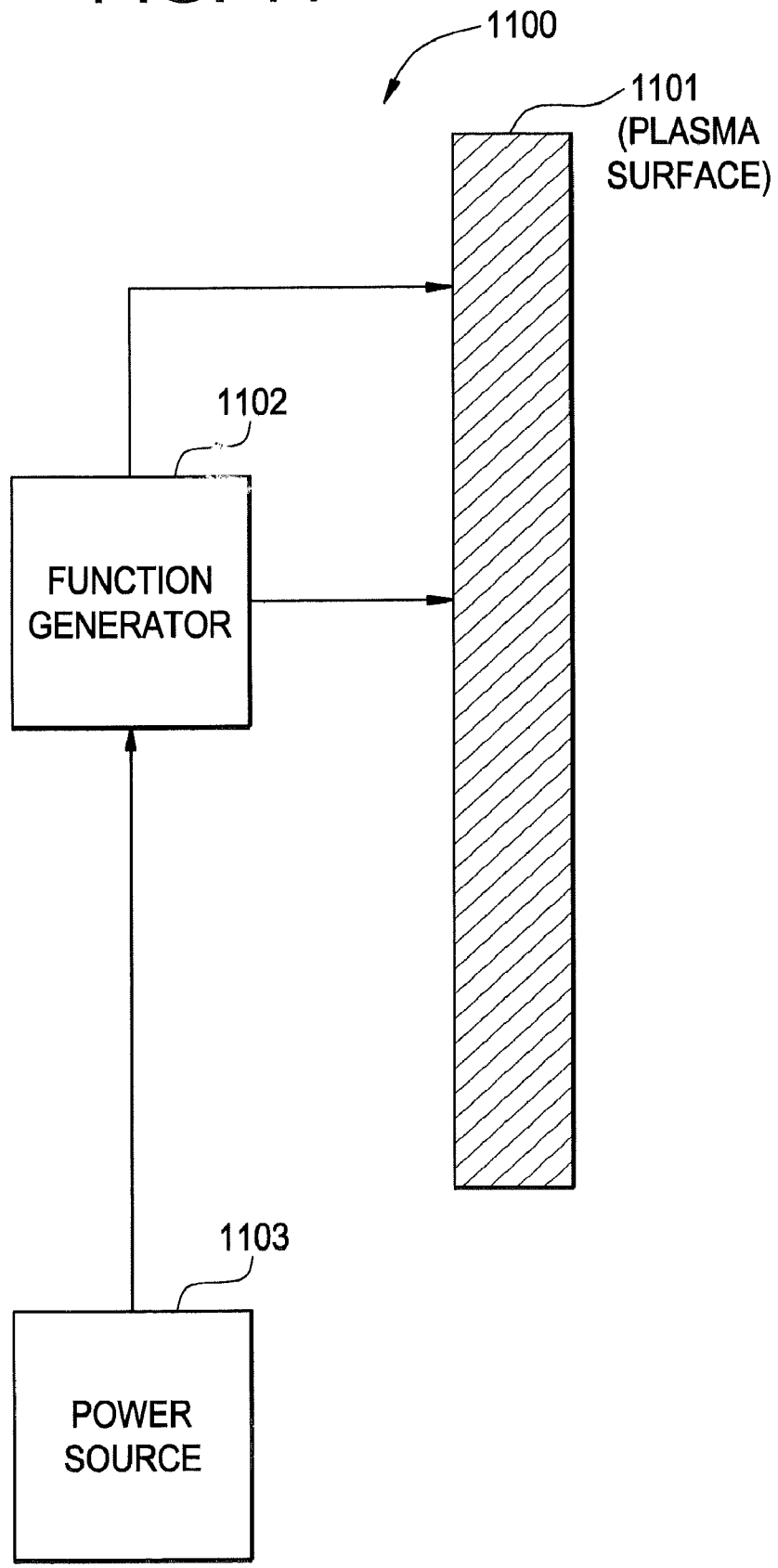
FIG. 11 illustrates a plasma actuation apparatus, according to an example embodiment.

Turning to FIG. 11 a plasma actuation apparatus according to an example embodiment is illustrated. The apparatus 1100 may include a plasma actuation surface 1101, a function generator 1102, and a power source 1103. In at least one example embodiment, the power source 1103 and function generator 1102 are a single unit 1110. For example, a power source may be configured to provide power according to a function.

The plasma actuation surface 1101 may be included on an airfoil, as described above. Additionally, a plurality of actuation surfaces may be in operative communication with the function generator 1102 and/or power source 1103. The plasma actuation surfaces may be included on one or more surfaces of an airfoil. Furthermore, the plasma actuation surfaces may be driven at different frequencies to enhance mixing and/or disruption to aid in reducing wake, tip-vortices, and interaction events of an airfoil. It follows that separate power sources or power source electrodes/function generator electrodes may be provided for any of the plasma actuation surfaces, or a single power source/function generator may be provided for all plasma actuation surfaces. Thus, example embodiments should not be limited to any particular configuration of power sources/function generators.

As described above, airfoils/blades are described with integrated plasma actuation surfaces which may be configured to reduce wake, tip-vortices, and hence the severity and impact of their interaction with downstream structures or blades/blades. The plasma actuation surfaces may be included in plasma actuation apparatuses for any number of airfoils/blades. As further described above, different geometric configurations of trailing edges and/or tips of airfoils/blades may be used in combination with plasma actuation apparatuses to further reduce interaction events, wake, and/or tip vortices. Plasma actuation devices, apparatuses, and/or surfaces as described herein are applicable to wind-turbine systems, pylons in propulsion systems, and any other suitable application.

With only some example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

The invention claimed is:

1. An airfoil, comprising:
a plasma actuation surface integrated onto the airfoil surface;
a function generator in operative communication with the plasma actuation surface; and
a power source in operative communication with the function generator, wherein
the function generator is configured to provide high-frequency oscillations to drive the plasma actuation surface such that excitation of vortex flow or shear flow mitigates the vortex flow or the shear flow associated with the airfoil.

2. The airfoil of claim 1, wherein:
the plasma actuation surface is located on a single surface of a trailing edge of the airfoil.

3. The airfoil of claim 1, wherein:
the plasma actuation surface is located on a single surface of a tip of the airfoil.

4. The airfoil of claim 1, further comprising:
a plurality of plasma actuation surfaces, wherein,
each plasma actuation surface of the plurality of plasma actuation surfaces is configured to provide high-frequency plasma actuation along the plasma actuation surface such that excitation of the vortex flow or shear flow mitigates the vortex flow or the shear flow associated with the airfoil.

5. The airfoil of claim 4, wherein:
a first plasma actuation surface of the plurality of plasma actuation surfaces is located on a single surface of a tip of the airfoil; and
a second plasma actuation surface of the plurality of plasma actuation surfaces is located on a surface of a trailing edge of the airfoil.

6. The airfoil of claim 4, wherein:
a first plasma actuation surface of the plurality of plasma actuation surfaces is located on a first surface of a trailing edge of the airfoil; and a second plasma actuation surface of the plurality of plasma actuation surfaces is located on a second surface of the trailing edge of the airfoil.

7. The airfoil of claim 6, wherein:
a third plasma actuation surface of the plurality of plasma actuation surfaces is located on a single surface of a tip of the airfoil.

8. The airfoil of claim 4, wherein;
the plurality of plasma actuation surfaces are located at different locations on a single surface of a tip of the airfoil.

9. The airfoil of claim 1, wherein:
a trailing edge of the airfoil is configured with a chamfered surface.

10. The airfoil of claim 9, wherein the plasma actuation surface is located on a facet of the chamfered trailing edge.

11. The airfoil of claim 1, wherein:
a trailing edge of the airfoil is truncated.

12. The airfoil of claim 11, wherein the plasma actuation surface is located on a single surface of the truncated trailing edge.

13. The airfoil of claim 11, wherein the plasma actuation surface is located on the truncated trailing edge and the plasma actuation surface extends onto dual-surfaces of the truncated trailing edge.

14. A power generating turbine system, comprising:
at least one airfoil as defined in claim 1.

15. The system of claim 14, wherein the turbine system is configured as a wind-turbine power generator.

* * * * *